April 27, 1943.   A. M. KRIEGER   2,317,468
APPARATUS FOR MEASURING STRIP
Filed Nov. 15, 1940   3 Sheets-Sheet 2
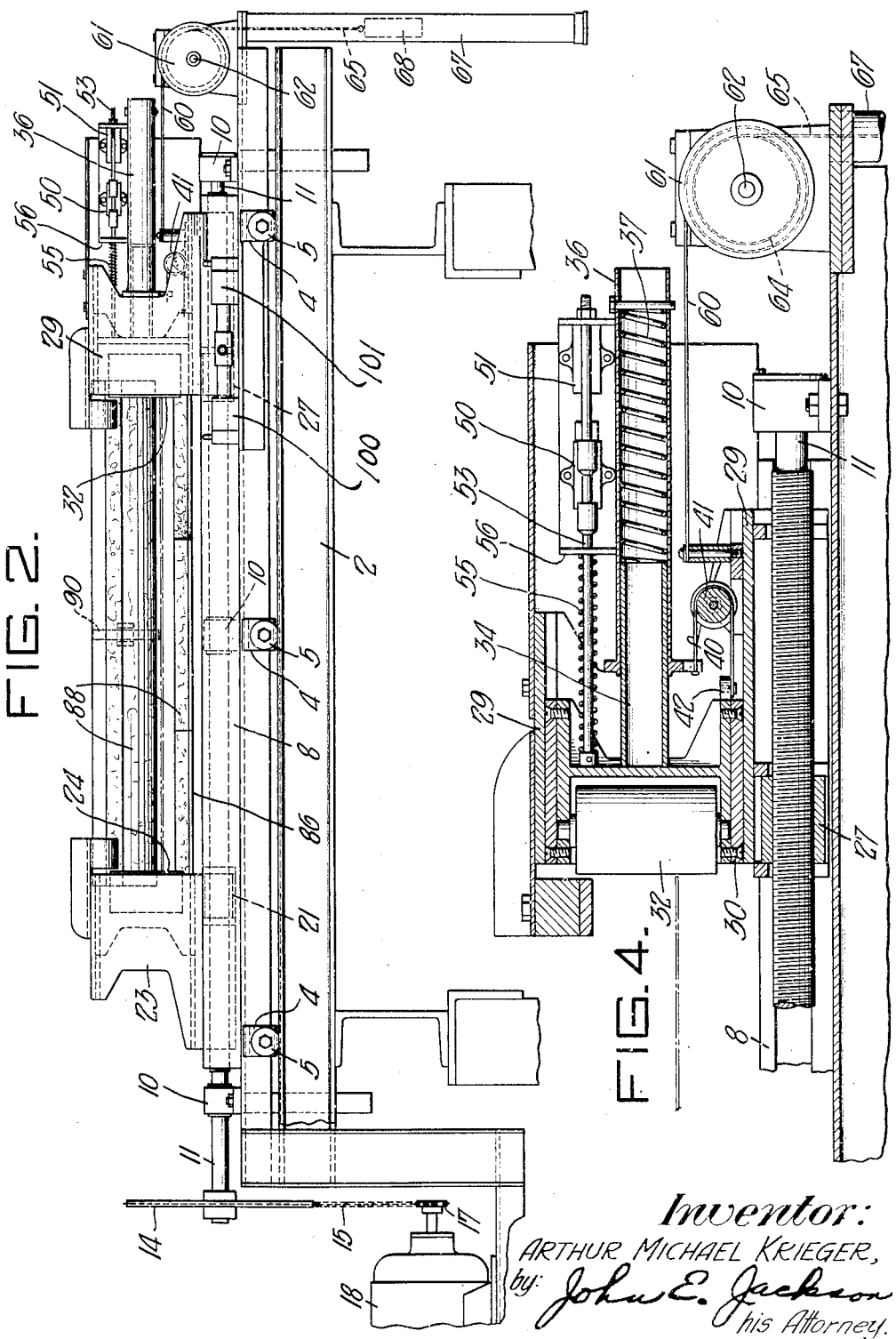
Inventor:
ARTHUR MICHAEL KRIEGER,
by John E. Jackson
his Attorney.

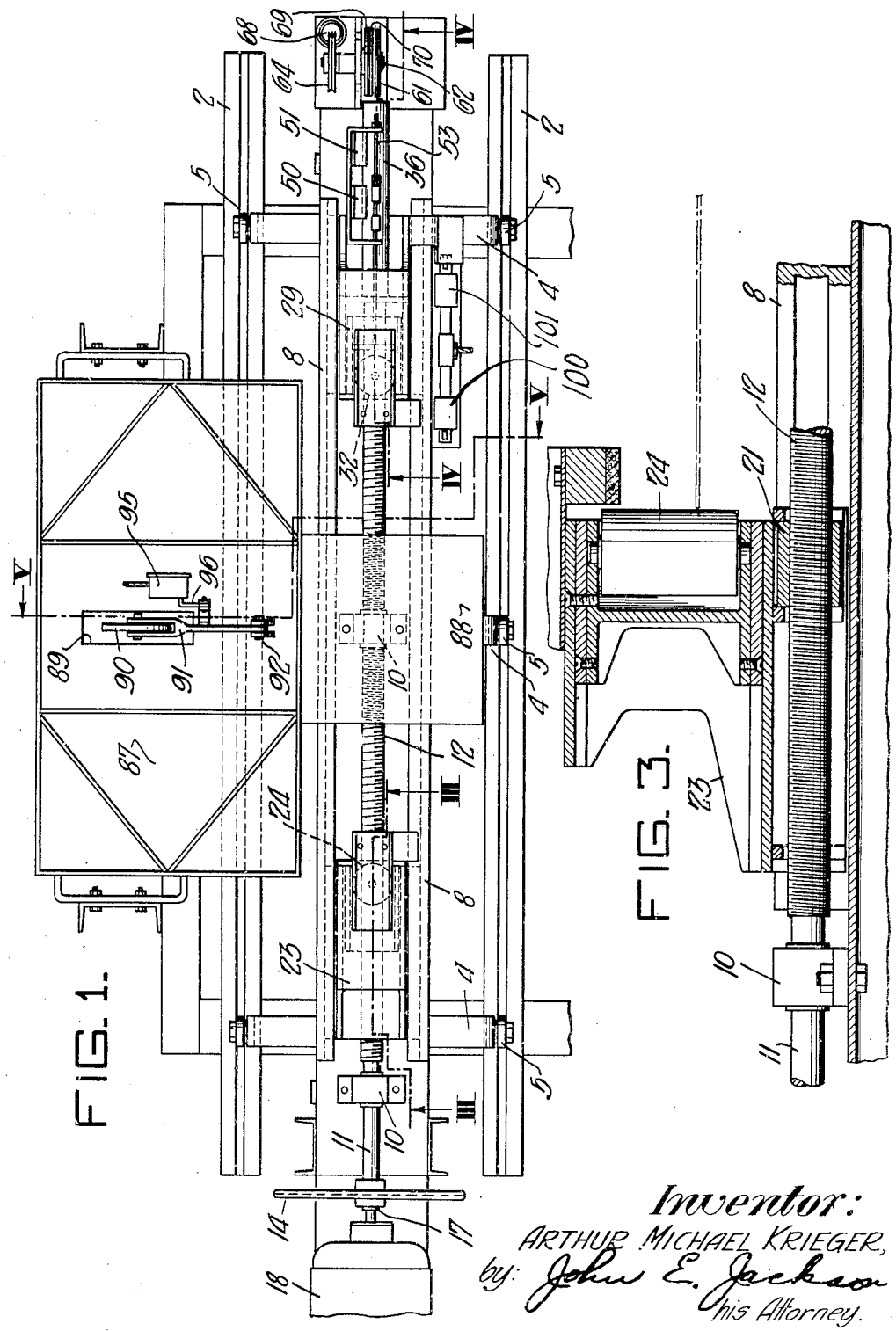

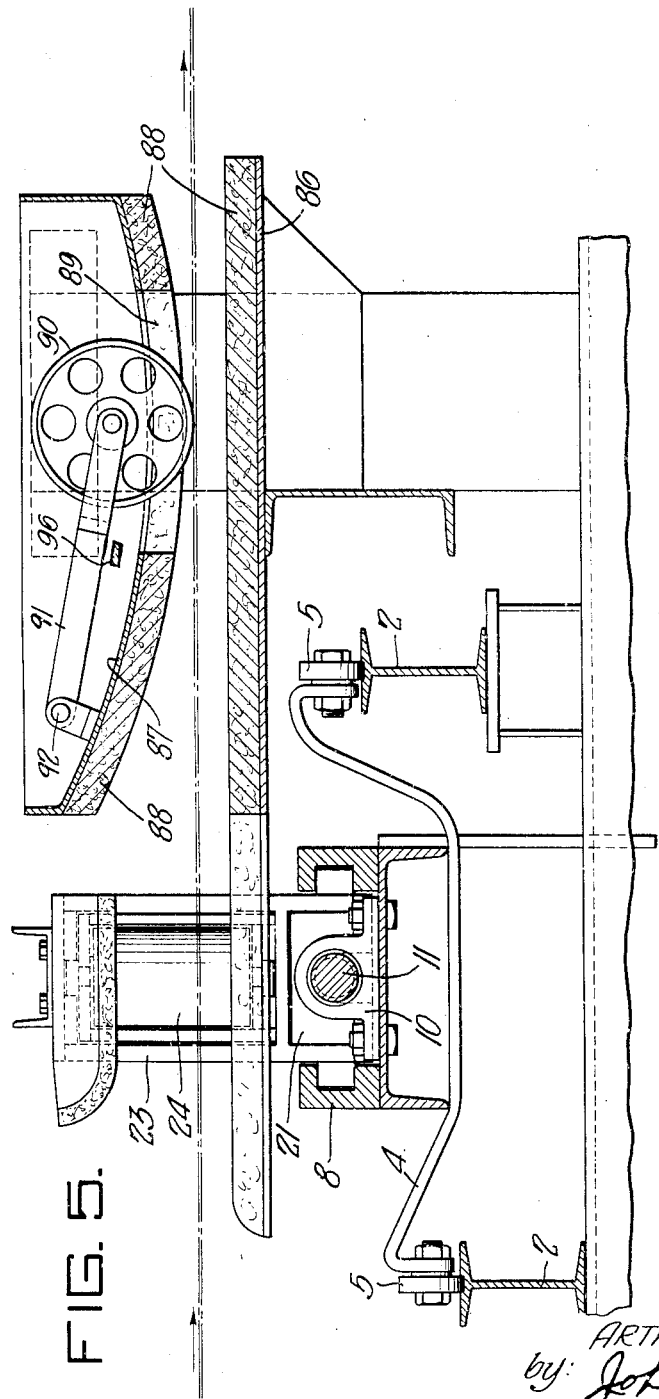

Patented Apr. 27, 1943

2,317,468

UNITED STATES PATENT OFFICE 2,317,468

APPARATUS FOR MEASURING STRIP

Arthur Michael Krieger, Mount Lebanon, Pa.

Application November 15, 1940, Serial No. 365,842

3 Claims. (Cl. 33—147)

This invention relates to an apparatus for measuring strip, and more particularly to one which is adapted to measure the width thereof.

It is among the objects of the present invention to automatically determine variations in the width of moving strips of material such as metal or other rigid material.

Another object is to provide an apparatus of the class described which is susceptible of rapid adjustment to accommodate strips having various widths.

Still another object is to measure the width of strip which has its edges curved.

The foregoing and other objects will be more apparent after referring to the drawings, in which:

Figure 1 is a fragmentary plan of the apparatus of the present invention.

Figure 2 is a side elevation of the showing of Figure 1.

Figure 3 is a sectional view taken on the line III—III of Figure 1.

Figure 4 is a sectional view taken on the line IV—IV of Figure 1.

Figure 5 is a sectional view taken on the line V—V of Figure 1.

Figures 6 and 7 are diagrams of electrical circuits which may be employed to effect the satisfactory operation of the apparatus of the invention.

Referring more particularly to the drawings, the apparatus of the present invention comprises a pair of spaced parallel rails 2 which are disposed at right angles to the direction of travel of the strip whose width is to be measured. For example, the spaced parallel rails 2 may be disposed transversely of a strip conveyor (not shown).

As shown in Figures 1 and 5, there is disposed between the spaced parallel rails 2 a plurality of spaced parallel supports 4 each of which has on its opposite ends an antifriction roller 5 riding in a complementarily formed groove on the top of the most adjacent rail.

Disposed to extend between the supports 4 is a frame generally designated at 8 which comprises adjacent each of its ends and also at the center thereof aligned bearings 10 in which there is journaled an elongated shaft 11. Intermediate the center bearing 10 and its counterparts at the ends thereof, the shaft 11 is oppositely screw-threaded; i. e., the shaft on the right-hand side of the bearing 10 being screw-threaded in one direction while the shaft on the left-hand side thereof is oppositely screw-threaded.

One end of the shaft 11 has secured thereto a sprocket wheel 14 which is driven by a chain 15 from a sprocket wheel 17 on the shaft of an electric motor 18, the latter being carried on a suitable outboard support which is secured to the frame 8.

Disposed between the center bearing 10 and one of the ends of the shaft 11, the latter has in screw-threaded engagement therewith a traveling nut 21 to which there is secured a housing generally designated at 23. Disposed in and carried by the housing 23 is an antifriction roller 24 mounted for rotation on a vertical axis.

According to the foregoing construction and arrangement, it will be perceived that the rotation of the shaft of the electric motor 18 in opposite directions will cause the traveling nut 21 and the antifriction roller 24 to move inwardly and outwardly with respect to the center bearing 10, to thus engage the adjacent side edge of a strip which may vary appreciably as to width.

Referring more particularly to Figure 4, the opposite end of the shaft 11 carries in screw-threaded engagement therewith a traveling nut 27 to which there is secured a housing 29. Slidably disposed on the housing 29 is a support 30 in which there is mounted for rotation about a vertical axis an antifriction roller 32 which is similar in size and construction to the roller 24 described hereinbefore. The slidable support 30 carries a centrally disposed outboard tubular extension 34 on which there is slidably carried an exterior tube 36 which is attached in any suitable manner to the housing 29. Within the tube 36 is a compression spring 37 which is suitably secured at one end thereof and adapted for contact with the outer end of the tubular extension 34. The end of the tube 36 which is most adjacent the slidable support 30 has secured thereto a strap 40 which extends away from the support 30, and around a traveling roller 41 which is slidably mounted on the housing 29. The direction of the strap 40 is then reversed, and its end attached as at 42 to the slidable support 30. According to this construction and arrangement, the traveling nut 27 will move oppositely with respect to the traveling nut 21 and carry with it the housing 29 along with the tubular extension 34, exteriorly disposed tube 36 and compression spring 37 which is carried within the latter. Thus the antifriction roller 32 is held in its outermost position by the expansive influence of the compression spring 37, except when the said roller is in contact with the adjacent edge of a strip to be measured, when its position may be any place within the operating range of the apparatus, as will appear more fully hereinafter.

Attached to the housing 29 is a pair of microswitches 50 and 51 which are operated by rod 53 which is attached to the slidable housing 30, the slidable rod 53 having its movement toward the microswitches 50 and 51 resisted by a compression spring 55 which is disposed between the support 30 and a suitable plate 56 through which the rod extends.

The measuring apparatus comprises a slide wire which is used as a potentiometer, a battery potential being put across the slide wire and a contact provided which rides the slide wire as it is turned by the motion of the antifriction roller 32 which is carried in the slidable support 30 on the housing 29, or the position of the slidable support 30 with respect to the housing 23 carrying the antifriction roller 24. Thus for every movement of the antifriction roller 32 and accordingly the slidable support 30 with respect to the housing 29, there is a change of position of the contact on the slide wire.

An operating cable 60 for the potentiometer is secured at one of its ends to the housing of the traveling roller 41 which is slidably mounted on the housing 29. This operating cable 60 is wrapped around a pulley 61 which is secured to a shaft 62 on the end of the frame 8. In spaced relation to the pulley 61 the shaft 62 has secured thereto a pulley 64 around which there is wrapped a cable 65 which extends downwardly into a tube 67 and carries on its lower end a counterweight 68. According to this construction and arrangement, the shaft 62 is influenced into clockwise rotation by the counterweight 68 and is moved in opposition thereto by means of the cable 60 which is secured to the sliding support 30. Carried on the shaft 62 intermediate the pulleys 61 and 64 is a potentiometer disc 69 carrying on its periphery a potentiometer slide wire 70 of conventional design. This potentiometer slide wire 70 engages a contact (not shown) which rides thereon in order that for every movement of the potentiometer disc 69 on the shaft 62 there is a change of position of the said contact on the slide wire 70. In the manner well known to the prior art, a battery potential is put across the slide wire 70 and suitable leads directed from the contact and the battery to a recording or indicating meter.

Referring more particularly to Figure 7, the potentiometer is generally indicated at 80, the battery at 81, the recording or indicating meter at 82, and an intermediately disposed rheostat at 83, the latter being provided for sensitivity. When using this arrangement, the measuring apparatus takes half of the width of the strip to be measured, doubles it, and records this reading. For an increase in width, the potentiometer disc 69 moves only one-half the amount of the said increase.

Referring more particularly to Figure 5, on the delivery side of the apparatus of the invention is a hold-down device which comprises a lower flat steel plate 86 and an upper curved steel plate 87 the adjacent faces of which are lined with fiber, as indicated at 88. The upper end of the curved steel plate 87 is provided with a slot 89 which extends longitudinally of, and is disposed over, the strip. This slot 89 also extends through the fiber 88 in order to permit the movement therethrough of a roller 90 which is carried on an arm 91 which is adapted for swinging movement about a pivot 92 which is carried on the upper face of the curved steel plate 87.

Referring more particularly to Figures 1 and 5, it will be perceived that the roller 90 carried on the pivoted arm 91 is mounted over approximately the center of the path of travel of the strip to be measured; and that the limit switch 95 is so constructed and arranged that an arm 96 forming part thereof lies immediately below the pivoted arm 91 carrying the roller 90. As soon as the strip passes from under the roller 90, the latter will drop through the slot 89 in the curved steel plate 87 and in so moving will cause the pivoted arm 91 carrying the roller 90 to contact the arm 96 of the limit switch 95 and cause the operation of the latter to energize a coil 97 to close contacts 97ª and initiate the movement of the reversible electric motor 18 to move the traveling nuts 21 and 27 and their respective housings 23 and 29 away from each other, taking with them the antifriction rollers 24 and 32, respectively.

Mounted on one side of the carriage 8 is a pair of limit switches 100 and 101 which control the minimum and maximum width of operations of the apparatus of the invention. The limit switch 100 operates to break the circuit to the reversible electric motor 18 when the antifriction rollers 24 and 32 are at their closest positions and acts only as a safety measure to keep the apparatus from being jammed in the "in" position. The limit switch 101 operates to break the circuit to the reversible electric motor 18 and acts to discontinue the further outward movement of the antifriction rollers 24 and 32 when the operation of the limit switch 95 has caused them to assume their most remote positions. The antifriction rollers will remain in their most remote positions as long as there is no strip passing under and in contact with the roller 90.

When a new strip moves under the roller 90 and raises it, the arm 96 of the limit switch 95 is also raised and this causes the limit switch to energize a coil 104 to close contacts 104ª to thereby complete the circuit to the reversible motor 18 whereby it is driven in the direction opposite that previously described. The inward movement of the antifriction rollers 24 and 32 is continued until they contact the edges of the strip, at which time the housing 29 overtravels the sliding support 30 and causes the shaft 53 to operate the microswitch 51. When the strip becomes narrower, the antifriction roller 32 moves the shaft 53 in the opposite direction to thereby cause the operation of the microswitch 50; and when the strip widens out, the antifriction roller 32 is moved outwardly, thereby causing the compression of the spring 37 until the shaft 53 has moved sufficiently to operate the microswitch 51.

The microswitches 50 and 51 are constructed and arranged to permit the sliding of the slidable housing 30 a determined number of inches in either direction before the shaft 53 causes them to close to thereby cause the operation of the reversible electric motor 18 in the desired direction.

It will be readily understood by those skilled in the art that numerous other devices may be employed for operating the recording or indicating meter in lieu of the potentiometer device shown and described, and that the latter as shown forms no part of the invention.

While I have shown and described certain specific embodiments of the present invention, it will be seen that I do not wish to be limited exactly thereto, since various modifications may be made thereto without departing from the scope of the invention, as seen by the appended claims.

I claim:

1. Apparatus for determining variations in width of continuous strip material comprising a pair of members movably arranged on each side of the strip for contacting the opposite edges thereof, means for interconnecting said members and for moving them toward and away from each other, said means normally maintaining said members in remotely spaced position, means operable by the strip for causing said first-named means to move said members into contact with the edges of the strip, one of said members being movable independently of the other, and means operable by said last-named member for indicating variations in the width of the strip.

2. Apparatus for determining variations in widths of continuous strip material comprising a pair of members movably arranged on each side of the strip for contacting the opposite edges thereof, means for moving said members toward and away from each other, means mounted on one of said members for limited movement independent of said members, means operable by said second named means for operating said first named means when the limit of movement is reached, and means operable by said second named means for indicating variations in the width of the strip.

3. Apparatus for determining variations in widths of continuous strip material comprising a pair of members movably arranged on each side of the strip for contacting the opposite edges thereof, means for moving said members toward and away from each other, means mounted on one of said members for limited movement independent of said members, means operable by said second named means for operating said first named means when the limit of movement is reached, means operable by said second named means for indicating variations in the width of the strip, and means operable by the strip for moving said members into contact with the edges of the strip.

ARTHUR MICHAEL KRIEGER.